(12) United States Patent
Olivier

(10) Patent No.: US 6,391,620 B1
(45) Date of Patent: May 21, 2002

(54) METHOD FOR BIO-CONVERSION OF PUTRESCENT WASTES

(76) Inventor: Paul A. Olivier, P.O. Box 250, Washington, LA (US) 70589

( * ) Notice: Subject to any disclaimer, the term of this patent is extended or adjusted under 35 U.S.C. 154(b) by 65 days.

(21) Appl. No.: 09/654,826

(22) Filed: Sep. 5, 2000

Related U.S. Application Data

(60) Provisional application No. 60/163,063, filed on Nov. 2, 1999.

(51) Int. Cl.[7] ................................................. B09B 3/00
(52) U.S. Cl. ................................ 435/262.5; 71/8; 71/9
(58) Field of Search ........................... 435/290.1, 290.4, 435/262.5; 71/8, 9

(56) References Cited

U.S. PATENT DOCUMENTS

| | | |
|---|---|---|
| 4,040,810 A | 8/1977 | Eby et al. |
| 5,741,344 A | 4/1998 | Warkentin |
| 5,759,224 A | 6/1998 | Olivier |
| 6,001,146 A | 12/1999 | Olivier |
| 6,016,306 A | 11/2000 | Olivier |

*Primary Examiner*—Wayne Langel
(74) *Attorney, Agent, or Firm*—Jones, Day, Reavis & Pogue

(57) ABSTRACT

Initially, putrescent waste is deposited on a surface of a disposal volume which is partially composed of putrescent waste. A living system bio-converts at least a portion of the putrescent waste in the disposal volume, transforming the putrescent waste into waste residue. While bio-conversion is occurring on a portion of the putrescent waste in the disposal volume, waste residue is excavated from the disposal volume below the surface of the disposal volume. Because the excavation takes place below the surface area, the bio-conversion process is not affected by excavating the waste residue. A device for continuous bio-conversion of putrescent waste comprises a disposal track having lateral side walls and floor for containing the disposal volume. An excavation gap is associated with at least one of the lateral side walls for excavating waste material from the disposal volume. The excavation gap is positioned substantially below the living system so waste can be excavated simultaneously with bio-conversion. The device further employs a scraper for excavating at least a portion of the waste residue. The scraper has a plurality of blades attached to a chain for excavating the waste and interposed between the blades are backplates which clean the blades as the chain rounds a sprocket. The scraper is moved along the floor of the disposal track as it excavates the waste material. The floor both supports the disposal volume and the scraper, and has a filter screen to filter water from the disposal volume.

10 Claims, 11 Drawing Sheets

Cross Section Of Disposal Track
300

Prior Art Bio-Conversion Facility for Putrescent Wastes
100

Prior Art Bio-Conversion Facility for Putrescent Wastes
200

Cross Section Of Disposal Track
300

Cross Section Of Disposal Track with Scraper
400

Side View Of Disposal Track with Scraper
400

Cross Section Of Disposal Track with Scraper and Putrescent Wastes
500

Side View Of Scraper
650

Plan View Scraper
650

Cross Section of Scraper with One-Piece Blade and Bottom Plate Assembly
750

Cross Section of Scraper with Blades and Backplates
850

Suspended Broiler Operation with Bio-Conversion Unit Underneath

Bio-Conversion Unit with Pump Spreader Application and Scraper

METHOD FOR BIO-CONVERSION OF PUTRESCENT WASTES

CROSS-REFERENCES TO RELATED APPLICATIONS

This application claims priority from Provisional Application No. 60/163,063, filed Nov. 2, 1999, and having the same inventor as the present application.

BACKGROUND OF THE INVENTION

1. Field of the Invention

The present invention relates in general to apparatus and method for disposal of putrescent waste material and in particular the continuous bio-conversion of putrescent waste material.

2. Description of Related Art

The production of organic compost for municipal refuse or garbage is well known. For example, U.S. Pat. No. 5,082,486 filed on Nov. 16, 1990 by Glogowski teaches a method for the production of organic compost comprising the following steps:
1. shredding the refuse;
2. adding water to saturation;
3. adding earthworms;
4. keeping the water content at more than 80% during at least 30 days; and
5. keeping the mixture at a temperature from 0–54° C. and with a moisture of at least 45% during more than 4 months.

Such a method is not suitable for continuous treatment of large amounts of putrescent waste. Furthermore, the separation of earthworms from the treated waste materials is very difficult.

The prior art suggests various types of bio-conversion facilities for facilitating the production of useful animal products from putrescent waste material. One device and associated method relates to the continuous treatment of large amounts of humid putrescent waste materials by means of fly larvae. Thus, after a relatively short period of a few days, the putrescent waste is converted into a slightly moist odor-free compost. After treatment of the waste materials, the use of fly larvae allows for separation of the larvae from the waste. Live or dehydrated larvae constitute an excellent feed stock for fish and poultry, but the larvae can also be used for the production of by-products such as protein meal, chitin, and chitosan. It has been observed that when using fly larvae for the treatment of putrescent waste materials, it is possible to induce them to crawl out of the waste by exposing the waste to an illumination, preferably together with a heating, especially an infrared illumination, whereby the separation of the larvae out of the putrescent waste is obtained by the larvae themselves.

FIG. 1 is a flow diagram of a prior art bio-conversion facility for continuous treatment of putrescent waste by means of fly larvae in which the fly larvae actually eat the waste. Facility 100 is further described by U.S. Pat. No. 5,759,224 filed on Aug. 22, 1996 by Paul A. Oliver and is incorporated by reference herein in its entirety. Facility 100 comprises walls 101 defining fly larvae cultivation chamber 102 for the treatment of putrescent waste. A stack of at least two conveyor belt systems 108, each having a waste reception zone 108A, a treatment zone 108B in which the putrescent waste is more or less completely eaten by fly larvae, and an evacuation zone 108C, is designed so as to transport the waste and the fly larvae eating the waste from the reception zone 108A towards the evacuation zone 108C.

A system 130 grinds putrescent waste material to be treated so as to form a pulp containing particles of more or less uniform grain size, the grain size being preferably smaller than the size of the mature fly larvae mouth, and a blending and holding tank 140 contains the ground putrescent waste. Pump 148 transfers the waste from the blending and holding tank 140 to paddle box 131. Variable speed control system 149 for pump 148 controls the discharge rate of waste into paddle box 131. A pipe or other transfer means 150 is used to transfer the ground waste from pump 148 into paddle box 131, the pipe or transfer means 150 being provided with heating system 144.

Valve 151 is mounted on pipe 150 to select sequentially the specific paddle box 131 and conveyor belt 108 that are to receive the waste. The distribution paddle box 131 has paddles that, in the preferred embodiment, turn in a direction opposite the flow of material so as to ensure a more or less even deposition of the ground putrescent waste down an inclined chute onto the central section of a long conveyor belt (80–100 meters), leaving the lateral surfaces of the conveyor belt free of waste. One or more distribution bags 110 contain an aqueous suspension of fly larvae eggs, the bags 110 being made preferably of plastic, and being connected to one or more tubes 145 through which the suspension liquid containing eggs drops onto the waste exiting the paddle box. A container with holes in the bottom could also be used to drip larvae onto the conveyor belt 108. A motor and speed reducer drives the conveyor belt 108, the motor being associated with a system well known in the art for controlling the speed of the conveyor belt 108. An air-conditioning system 112 controls the most appropriate temperature, humidity, and oxygen content in the fly larvae cultivation chamber (for example, between 28° C.–38° C. [82° F.–100° F.] between 30–90% relative humidity), depending on the species of fly larvae used. An air-scrubbing system 113 deodorizes the waste material leaving the fly larvae cultivation chamber in a well-known manner.

Infrared lamps 115 are located in evacuation zone 108C for inducing the larvae to crawl out of the waste. Two troughs 116, one on each lateral side of the conveyor belt (not shown), collect and transport the larvae falling or sliding from conveyor belt 108, each trough 116 having a water inlet (inlet 117 ) so as to create a high-speed water stream for transporting the larvae out of the trough, as well as an outlet (outlet 147) for evacuating the water and fly larvae. Transfer pipe 146 connects outlet 147 of a first conveyor belt trough to inlet 117 of a second conveyor belt trough, the second conveyor belt preferably being situated below the first. Pipe 118 through which the water stream with larvae flows toward a central rinsing and de-watering device 119 that may be, for example, a vibratory de-watering screen. Conveyor belt scraper 141 is used for scraping and cleaning the conveyor belt and for transferring the fly larvae residue onto chute 142. Centralized conveyor belt 143 receives waste from one or more waste chutes 142 and a storage area or surge bin (not shown) receives the waste from conveyor belt 143. Variable speed control system 123 is used to determine the speed or the intermittent movement of the conveyor belt (for example, if the larvae in the evacuation zone have not reached optimal maturation, the speed of the conveyor belt is reduced so as to increase the residence time of the larvae on the conveyor belt). System 132, shown in phantom lines in FIG. 1 and well known in the art, may be used for measuring the thickness of the waste deposited on the conveyor belt and controlling the amount of eggs or larvae to be added to the waste so that the appropriate amount of eggs or larvae is added according to the thickness of waste on the belt, the system controlling, for example, the outlet of eggs or larvae from the distribution box 110. System 138, well known in the art, can be used for determining the presence of heavy metals or other contaminants in the waste, the system preventing the entry of contaminated waste into the blending and holding tank 140.

Paddle box 131 ensures an even deposition of the waste from a chute incorporated in paddle box 131, between distribution arms, on conveyor belt 108, but not over the entire width of the conveyor belt 108. This leaves the lateral surfaces of conveyor belt 108 adjacent the lateral edges free of waste. The lateral surfaces are preferably about 10 cm in width and are provided with pins, needles, bristles, indentations, or holes, all of which may serve as a means for improving the detachment of waste particles adhering to the larvae crawling off the conveyor belt.

Upon reaching maturity, fly larvae naturally crawl out of the waste but, since they do not all reach maturity at exactly the same time, infrared lamps 115 are used for inducing the fly larvae to crawl out of the waste and off the conveyor belt in a synchronized and orderly manner. Even the direction in which the fly larvae crawl can be controlled by means of the graduated application of light and heat. Lamps 115 are preferably mounted in the form of a triangle, with one corner of the triangle intersecting the vertical plane passing through the middle line of the conveyor belt as shown so as to induce the fly larvae to crawl left and right of the middle line. When the conveyor belt is in motion, preferably all the lamps within the triangle are ON. When the conveyor belt is not in motion, preferably only some of the lamps are ON, effectively providing a barrier across which the fly larvae would be reluctant to crawl. Instead the mature fly larvae move laterally on conveyor belt 108 into one of the two troughs 1 16 on each lateral side of conveyor belt 108 for collection. The larvae collected in the trough 116 can be sold as live fly larvae, but preferably they are further treated in a plant 126 for producing protein meat, chitin, chitosan and other valuable products.

The above-described device and associated method discloses producing a continual supply of mature fly larvae by maintaining co-existing populations of fly larvae at different states of development. Putrescent waste materials and fly eggs are continually added to a conveyor belt on which fly larvae mature. Simultaneously, waste residue is continually scraped from the moving conveyor belt at a point on the conveyor after the fly larvae have matured. The waste residue may then be processed using an alternative bio-conversion process. Alternatively, the waste residue may be composted or sold as product. However, the above-described device is rather complex and expensive to construct, maintain and operate. Furthermore, in situ operations involving the invention are not cost effective because the putrescent waste material must be deposited on the conveyor belt in a specified position. This insures that the fly larvae extract the maximum nutritional value from the waste material prior to the waste residue being scraped from the conveyor belt.

FIG. 2 is a cutaway diagram of another prior art bio-conversion facility for treatment of putrescent waste. The example described below has been developed by Craig Sheppard, Jeffery K. Tomberlin and Larry Newton at the National Environmentally Sound Production Laboratory at the College of Agriculture & Environmental Sciences at The University of Georgia. Facility 200 may also bio-convert putrescent waste by means of fly larvae whereby the fly larvae actually eat the waste material or bacteria which occurs on the waste, as discussed above with respect to facility 100 shown in FIG. 1. However, unlike facility 100, facility 200 depicted in FIG. 2 may be an in situ facility co-located with putrescent waste material producing operation.

Facility 200 depicts the bio-conversion of putrescent wastes from caged laying hens at an egg laying facility. Each laying hen excretes an amount of putrescent waste material and the fly larvae feed on the hen waste. Cages 244 are suspended in a staggered arrangement above disposal volume 202 in such a manner as to expose a maximum area of cage floor mesh to disposal area 202. By configuring cages 244 in such an arrangement, waste falls from cages 244 directly into disposal volume 202, thereby eliminating the need to transport the putrescent waste material to disposal volume 202. In the present arrangement, cages 244 are arranged in four separate stacks with walkways 242 on either side of each stack. Walkways 242 extend the length of facility 200, as do cages 244.

Positioned below walkways 242, disposal volume 202 is subdivided by wall 208. At either side of disposal area 202 ramps 204 are positioned which lead to collection tubes 206. Collection tubes 206 are fabricated with longitudinal openings adjacent to ramps 204 (not shown), which run the length of collection tubes 206. As the laying hens in cages 244 deposit putrescent waste into disposal area 202 fly eggs are introduced. Fly larvae hatch from the eggs. When the fly larvae mature, the mature larvae surface from the putrescent waste in search of a more favorable environment to pupate. Fly larvae feed in only the top few inches of waste, but interestingly a population of fly larvae will tend to self regulate its numbers in order to extract optimal nutrition from each layer of waste prior to reaching the maximum feeding depth of the fly larvae.

Once the fly larvae reach maturity, the mature larvae crawl out of the putrescent waste material and onto the surface. The fly larvae attempt to navigate off of the surface of disposal volume 202 and away from the waste, as the larvae no longer need to feed on the waste. Facility 200 affords the mature larvae with only one avenue of escape from the putrescent waste, up ramps 204 and into collection tubes 206 where the larvae are collected and processed.

The deposition of waste material and collection of mature fly larvae continue unabated until waste residue must be collected from disposal area 202. Waste residue is the byproduct of the putrescent waste material after the bio-conversion process. The waste residue is of no value to the fly larvae and therefore must be removed from beneath cages 244 in order to provide additional space for new putrescent waste. However, it is impossible to remove only the waste residue without also removing the colony of fly larvae feeding in the top layers of the putrescent waste. The waste residue may be removed manually with shovels or may instead be collected by the bucket of a front-end loader and transported from disposal volume 202.

While facility 200 has the advantage of being less complex and expensive to implement than bio-conversion facility 100 in FIG. 1 discussed above, it has a disadvantage of being less efficient than facility 100. With respect to facility 200, disposal area 202 contains a colony of fly larvae in different stages of development, from newly hatched larvae to mature larvae because new fly eggs are introduced to the waste as larvae leave the disposal area. The colony is homogeneously distributed across the top few inches of putrescent waste disposal volume 202. However, each time the waste residue is removed from disposal area 202 an entire colony of fly larvae is destroyed. Production of mature fly larvae can only resume after new fly eggs are laid and their larvae mature. Other inefficiencies inherent with facility 200 are due to the loss of the top few inches of putrescent waste before it can be fully converted by the fly larvae and problems associated with re-regulating the population of larvae with the rate of deposition from the laying hens.

SUMMARY OF THE INVENTION

The present invention relates in general to apparatus and method for disposal of putrescent waste material and in particular the continuous bio-conversion of putrescent waste material. Initially, putrescent waste is deposited on a surface of a disposal volume which is partially composed of putrescent waste. A living system bio-converts at least a portion of the putrescent waste in the disposal volume, transforming the putrescent waste into waste residue. While bio-conversion is occurring on a portion of the putrescent waste in the disposal volume, waste residue is excavated from the disposal volume below the surface of the disposal volume. Because the excavation takes place below the surface area, the bio-conversion process is not affected by excavating the waste residue. A device for continuous bio-conversion of putrescent waste comprises a disposal track having lateral side walls and floor for containing the disposal volume. An excavation gap is associated with at least one of the lateral side walls for excavating waste material from the disposal volume. The excavation gap is positioned substantially below the living system so waste can be excavated simultaneously with bio-conversion. The device further employs a scraper for excavating at least a portion of the waste residue. The scraper has a plurality of blades attached to a chain for excavating the waste and interposed between the blades are backplates which clean the blades as the chain rounds a sprocket. The scraper is moved along the floor of the disposal track as it excavates the waste material. The floor both supports the disposal volume and the scraper, and has a filter screen to filter water from the disposal volume.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
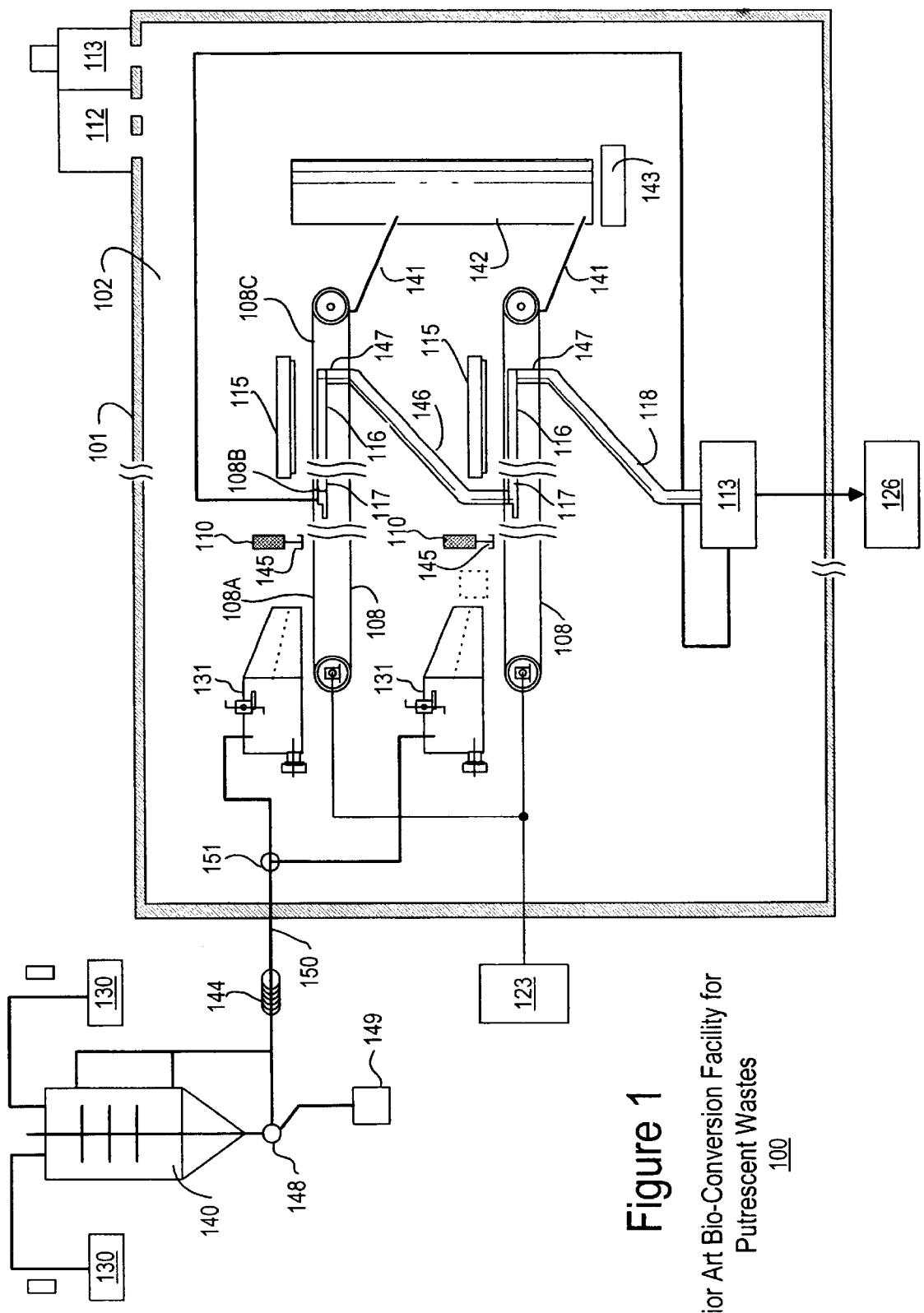
FIG. 1 is a flow diagram of a prior art bio-conversion facility for continuous treatment of putrescent waste by means of fly larvae in which the fly larvae actually eat the waste.
Figure 2:
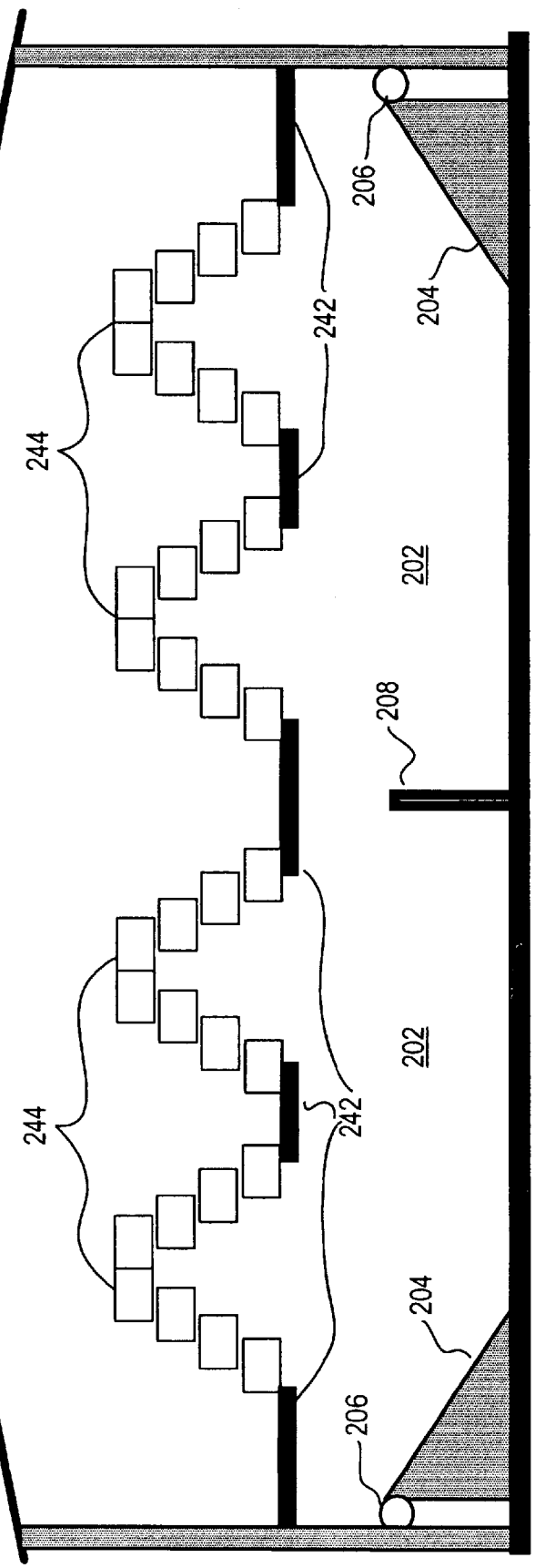
FIG. 2 is a cutaway diagram of another prior art bio-conversion facility for treatment of putrescent waste.

Our species generates huge quantities of putrescent waste:
farm waste from plants, animals and birds
food storage waste (silos, granaries, warehouses)
food preparation facilities which sort, grade, peel, slice, cook, can, freeze dry & packaged food
waste from institutional, restaurant & domestic kitchens and
sewage waste Even though insects are a major component of the natural food chain, few people have seriously entertained the idea of using them within the human/animal food chain. Lindner, in 1919, suggested raising housefly larvae (*Musca domestica*) on human waste as a source of protein and fat. Calvert et al. (1969, 1971) and Teotia and Miller (1974) showed that the housefly larvae raised on chicken manure were an excellent source of high quality protein. At about the same time, Dashefsky et al., (1976) showed that the pupae of the facefly, (*Musca autumnalis*), contain a high amount of phosphorus and protein.

Nature holds the key to the last and efficient decomposition of all of these waste streams. Nature uses a broad range of living systems to accomplish this task as listed below in Table I.

TABLE I

| bacteria | springtails | flatworms |
| fungi | beetles | snails |
| protozoa | sowbugs | slugs |
| actinomycetes | roundworms | termites |
| mites | spiders | ants |
| millipedes | pseudo-scorpions | fly larvae |
| centipedes | rotifers | earthworms |
| nematodes | red worms | |

Obviously, it would not be feasible to promote all of these organisms in a single waste management system. Several, however, are of special interest:
mesophilic aerobic bacteria
fly larvae
actinomycetes and fungi
earthworms Care must be taken when selecting the type of organism for the decomposition process. For example, anaerobic bacteria are not allowed to play a part in a decomposition process which includes the use of fly larvae. The use of anaerobic bacteria would not be practical because as fly larvae tunnel their way through the waste, there is sufficient aeration to inhibit the growth of anaerobic bacteria. Additionally, thermophilic aerobic bacteria, which thrive at temperatures between 115° F.–160° F., are also not allowed to play a part in this decomposition process which involves fly larvae. Through the action of the larvae within the waste, thermophilic temperatures are never reached. The exclusion of anaerobic and thermophilic aerobic bacteria has important implications in the conservation of energy and protein associated with the true recycling of putrescent waste materials.

In the anaerobic reduction of waste, the carbon from the organic compounds not used in the production of cell protein is liberated mainly as methane ($CH_4$). As a greenhouse gas, methane has an effect 20 times more damaging to our atmosphere than carbon dioxide ($CO_2$). Also, anaerobic reduction is usually accompanied by the toxic and very disagreeable odors of hydrogen sulfide ($H_2S$) and reduced organic compounds containing sulfur (mercaptans). Furthermore, in anaerobic reduction, organic nitrogen is reduced to organic acids and ammonia ($NH_3$). Therefore, anaerobic reduction is not an ideal way to recycle nutrients from waste materials.

Oxidation at thermophilic temperatures takes place very rapidly. If temperatures within the waste can climb to over 170° F., then the energy within the waste is uselessly dissipated. For example, the aerobic decomposition of a single gram-molecule of glucose releases 484 to 674 calories (kcal) of heat. Most of the nitrogen contained in living cells as protein is uselessly released in the form of ammonia, while some of this ammonia may further oxidize to nitrate. Huge amounts of $CO_2$ and ammonia are released into the atmosphere. The ammonia eventually returns to the earth in rainfall, polluting our streams and rivers. The entire thermophilic decomposition process grinds down to an equilibrium state of maximum entropy. As is realized from the above discussion, very little nutrients are actually recycled.

Because anaerobic and thermophilic aerobic bacteria are not very helpful in the recycling of putrescent waste materials, mesophilic bacteria are being considered as a possible alternative, specifically mesophilic bacteria which thrive at temperatures between 50° F.–115° F. A plethora of diverse mesophilic bacteria play an indispensable role in breaking down, ingesting, reforming and hence recycling nutrients within a broad range of waste materials. It is suggested by many entomologists that some species of fly larvae do not feed primarily upon the waste but upon this mix of mesophilic bacteria proliferating within the waste.

With the exception of lignin, these bacteria can utilize almost any organic source. They produce a variety of enzymes enabling them to consume more than a hundred different organic compounds as their source of carbon. These bacteria play an essential role not only in conserving nutrients but also in upgrading the quality of nutrients present in the waste. Given a good carbon to nitrogen ratio within the waste, these bacteria do an exceptional job of combining carbon and nitrogen into protein. This bacteriological protein serves as an important food source for fly larvae. As the larvae consume bacteria of a high nitrogen content, the remaining residue becomes depleted in nitrogen, thus greatly reducing the likelihood of the generation of ammonia.

The common housefly, *Musca domestica* is one of the most commonly known fly species. Its life cycle consists of four stages: egg (8 to 12 hours), larvae (3 to 4 days), pupa (4 to 5 days), adult fly (up to 30 days). The larvae progress through three stages, associated with molting, called instars. Normally an adult female will produce about 500 to 600 eggs in her lifetime, however, it is the fly larvae that is primarily of interest as a product. The composition of housefly pupae grown in CSMA fly medium is as follows:

63.1% protein
15.5% fat
3.9% moisture
5.3% ash
12.2% other*
*primarily nitrogen free extract and fiber The composition of housefly pupae grown in chicken manure as follows:

61.4% protein
9.3% fat
11.9% ash
17.4% other

Amino acid analysis of housefly larvae grown on CSMA fly medium is shown in Table II.:

TABLE II

| | |
|---|---|
| 4.2% arginine | 3.4% valine |
| 3.9% glycine | 10.8% glutamic acid |
| 2.6% histidine | 4.2% alanine |
| 3.5% isoleucine | 0.4% cystine |
| 5.3% leucine | 4.9% tyrosine |
| 5.2% lysine | 3.1% proline |
| 2.6% methionine | 3.2% serine |
| 4.2% phenylalanine | 8.5% aspartic |
| 3.4% threonine | 2.1% ammonia |

Fatty acid analysis of housefly larvae grown on CSMA fly medium is as follows:

0.6% lauric
3.2% myristic
27.6% palmitic
20.6% palmitoleic
2.2% stearic
18.3% oleic
14.9% linoleic
2.1% linolenic
10.5% unidentified Amino acid analysis of housefly larvae grown on chicken manure is shown in Table III.

TABLE III

| | |
|---|---|
| 3.7% arginine | 2.7% valine |
| 2.4% glycine | 7.2% glutamic acid |
| 2.0% histidine | 2.5% alanine |
| 2.4% isoleucine | 3.8% tyrosine |
| 3.4% leucine | 2.3% proline |
| 3.8% lysine | 1.9% serine |
| 1.6% methionine | 5.3% aspartic |
| 3.0% phenylalanine | 11.1% ammonia |
| 2.1% threonine | |

Amino acid composition indicated that protein quality of house fly pupae is comparable with that of meat-and-bone meal or fish meal, and superior to soybean oil meal. Pupae are a good source of limiting amino acids, particularly arginine, lysine and methionine.

The black solider fly, *Hermetia illucens*, is a wasp-like fly indigenous to the Southeastern United States. The genus Hermetia, contains approximately 1,500 different species in the United States. *H. illucens* passes through four stages of development.

egg (102 to 105 hours)

larva (normally 2 weeks, but can extend to 4 months)

pupa (normally 2 weeks, but can extend to 5 months)

adult fly (5 to 8 days)

The larvae progress through five separate larval stages. Mature larvae are more than an inch long. Normally an adult female will produce about 900 eggs in her lifetime.

The composition of dried solider fly larvae is as follows:

42.1% crude protein 34.8% ether extract 7.0% crude fiber 7.9% moisture 1.4% nitrogen free extract (NFE)

14.6% ash 5.0% calcium 1.5% phosphorus

Amino acid analysis of solider fly larvae is shown in Table IV.

TABLE IV

| | | | |
|---|---|---|---|
| 2.24% | arginine | 3.81% | glutamic acid |
| 2.88% | glycine | 3.69% | alanine |
| 1.91% | histidine | 0.06% | cystine |
| 1.96% | isoleucine | 2.51% | tyrosine |
| 3.53% | leucine | 3.26% | proline |
| 3.37% | lysine | 0.12% | serine |
| 0.86% | methionine | 4.56% | aspartic acid |
| 2.2% | phenylalanine | 1.2% | ammonia |
| 0.55% | threonine | 0.2% | tryptophan |
| 3.41% | valine | 0.06% | unknowns |

Fatty acid analysis of solider fly larvae is as follows:

1.6% caproic 53.2% lauric 6.6% myristic 8.4% palmitic 1.7% stearic 12.4% oleic 8.8% linoleic 7.3% other The present invention will be described below with respect to using fly larvae as the bio-conversion living system, however, it should be understood that the inventive features of the present invention do not require use of fly larvae to the exclusion of any other living system. To the contrary, the features of the present invention accommodate the use of a wide range of bio-conversion living systems. Examples of such are described by U.S. Pat. Nos. 5,759,224 and 6,001,146 filed on Aug. 22, 1996 and Jun. 6,1997, respectively, by Paul A. Oliver and are incorporated by reference herein in their entirety.

Figure 3:
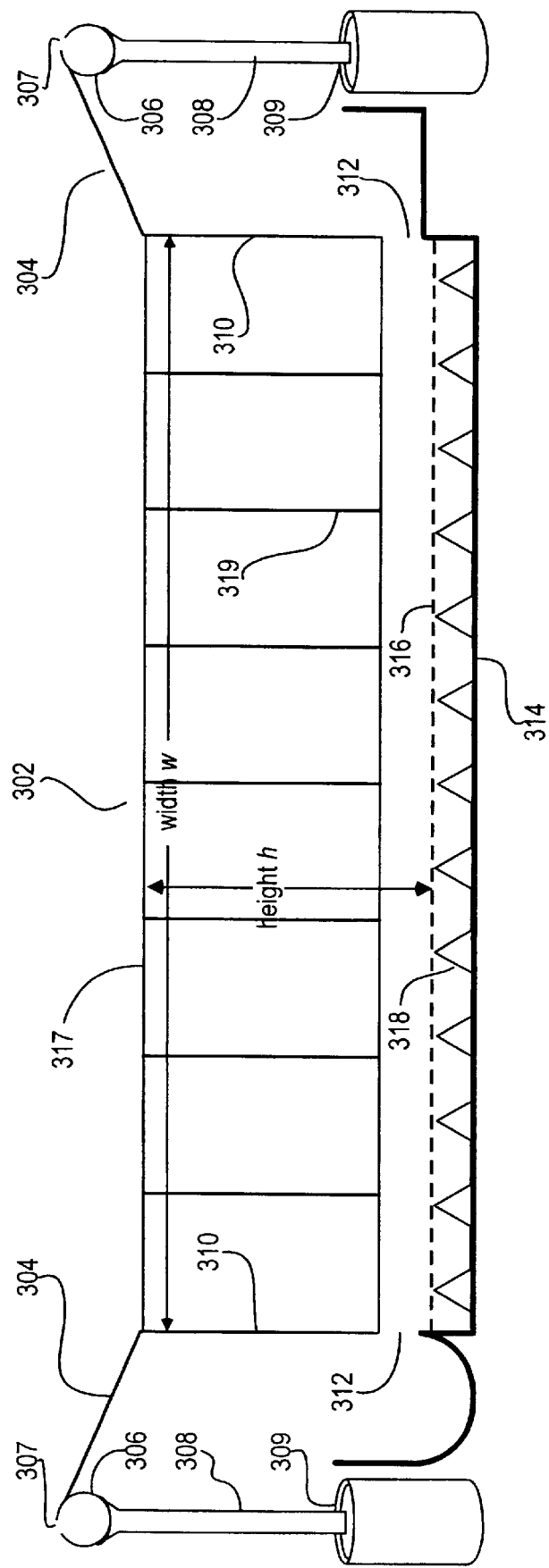
FIG. 3 is a diagram of a cross-section of disposal track utilized in a bio-conversion facility for putrescent waste material in accordance with a preferred embodiment of the present invention.

With reference to FIG. 3 a diagram of a cross-section of disposal track utilized in a bio-conversion facility for putrescent waste material is depicted in accordance with a preferred embodiment of the present invention. Waste material or more correctly, putrescent waste material and the bio-conversion living systems that feed on the putrescent waste material are confined in long disposal containers called "tracks" or "disposal tracks." Disposal track 300 encompasses a disposal volume, the cross-section of which is depicted by disposal area 302. Disposal area 302 is flanked by vertical curtain 310 which folds away from disposal area 302 forming ramp 304. Width w of disposal area 302 in disposal track 300 may vary from a few feet to approximately 20 feet and the overall width of disposal track 300 including ramps exceeds that. The length of a track may vary from a few feet to more than 1000 feet.

Flanking vertical curtains are further joined to front and rear sides (not shown), which delineate the disposal volume. Lateral support for the portion of vertical curtain 310 proximate the front and rear sides is provided by the sides, however, long runs of vertical curtain 310 require further support because the curtain lacks the structural integrity necessary to support large volumes of waste material. Therefore, in accordance with another preferred embodiment of the present invention, a series of lateral panels are positioned inside disposal track 300. Either end of every lateral panel 317 is connected to opposite vertical curtains flanking disposal area 302. Vertical curtains 310 are thus prevented from buckling outward under the stress of a heavy load of waste material. However, here again the force of the waste material on the lateral run of lateral panel 317 may introduce instability in lateral panel 317 so a series of longitudinal panels are interposed between the series of lateral panels. Longitudinal panel 319 runs parallel to vertical curtain 310 and may be connected to front and rear sides of disposal track 300. It is expected that both the lateral panels and longitudinal panels are securely fastened to one another, the vertical curtains and front and back sides by corrosion resistant fasteners or welding. Once secured, the sides, curtains and panels form a rigid, one-piece disposal track capable of withstanding the force exerted by the waste material and vibration resonance associated with excavating waste residue, discussed in detail below.

Height h of disposal area 302 in disposal track 300 also varies depending on the feeding depth of the type of living system selected for the bio-conversion process and therefore., at a minimum height h must accommodate the living system. In accordance with a preferred embodiment of the present invention the minimum height h of disposal track 300 is equivalent to the combined feeding depth of the selected bio-conversion living system and the height of a waste residue excavation interval (the waste residue excavation interval will be discussed in detail below with respect to the scraper in FIG. 4A).

Ramp 304 extends approximately one foot at an uphill inclination of 15°–40°, however, these parameters are merely exemplary and may be modified depending on the lifecycle of the selected living system. Ramp 304 in the present example is intended for larvae-like organisms and may be omitted when disposal track 300 utilizes other living systems for bio-conversion. In the case of fly larvae, ramp 304 abuts collection tube 306. Collection tube 306 runs parallel and is attached to ramp 304 at longitudinal slit 307 which formed in the upper portion of collection tube 306. The slit is proximate to the upper extent of ramp 304. Downspout(s) 308 are positioned at predetermined intervals along collection tube 306 which are designed to act as a conduit to container 309 for trapping and holding the larvae. Container 309 is a convenient holding means temporary storage of live larvae prior to collection.

In accordance with a preferred embodiment of the present invention, vertical curtain 310 does not intersect the floor of disposal area 302; instead, residue excavation gap 312 is formed between the lower edge of vertical curtain 310 and the bottom of disposal area 302. The function of excavation gap 312 will be discussed in detail below. In further accordance with a preferred embodiment of the present invention, the floor of disposal track 300 is formed by under-pan 314, which is positioned beneath disposal area 302 of disposal track 300. Under-pan 314 may be supported by any expanse of ground or flooring having a level area capable of accommodating the area of under-pan 314. However, due to the need for residue excavation gap 312, under-pan 314 cannot support either vertical curtains 310 or the one-piece disposal track described above. Instead, vertical curtain 310 must be secured to pilings, or other similar support mechanisms (not shown), which are positioned outside the lateral extent of under-pan 314. Vertical curtains 310 or one-piece disposal track 300 may instead be suspended from an overhead framework. Whichever manner of support selected, residue excavation gap 312 must be maintained between vertical curtain 310 and under-pan 314.

Under-pan 314 supports the load created by putrescent waste and waste residue in the disposal area and provides a means for filtering water from the waste residue away from disposal area 302. In addition, under-pan 314 also serves to aerate the outgoing waste residue and elevates a scraper on a plane with gaps 312. This function will be discussed in greater detail below. In accordance with a preferred embodiment of the present invention, under-pan 314 is comprised of screen 316 supported longitudinally by prisms 318. Screen 316 may be composed of a plurality of layers of increasingly finer diameter filtration material. For example, an initial layer of screen 316 may be composed of a metal grid such as expanded metal commonly referred to as diamond mesh, which provides the necessary strength for supporting the waste in disposal area 302. In addition to the layer of expanded metal grid, screen 316 may comprise a second layer of finer diameter mesh applied over the metal grid. The diameter of the finer mesh determines the size of the particulate waste mater restricted from percolating into under-pan 314 with the filtrate. Depending on the strength and filtering properties of available meshes, screen 316 may be comprised of more than two mesh layers in order to accommodate the unique strength and filtration requirements for a particular bio-conversion application.

Screen 316 is supported by prisms 318 which are equally spaced along screen 316 by a predetermined amount and run lengthwise parallel to the length of disposal track 300. Note that the runoff of filtration fluids across prisms 318 will be channeled in troughs created by the space between adjacent prisms. Prisms 318 may be constructed from individual lengths of angle iron wherein each length of angle iron has the necessary dimensions to support screen 316 and the height adjacent the opening of gap 312. Of course, both screen 316 and prisms 318, as well as every other part of under-pan 314, must be either fabricated of corrosion-resistant materials or treated so as to resist the naturally corrosive properties of the putrescent waste and filtration fluids drained away by under-pan 314.

In accordance with other embodiments of the present invention, prisms 318 in under-pan 314 are replaced by a latticework of intersecting vertical partitions (not shown) which provide the necessary support for a scraper. However, because disposal track 300 may extend lengthwise for hundreds of feet, lengthwise runs of vertical partitions are intersected at right angles and run side-to-side for strength. Alternatively, this lattice of intersecting vertical partitions may instead be oriented at forty-five degree angles from vertical curtain 310. Any latticework structure must be provided with drainage or weep hole to allow runoff of filtration fluids to migrate toward a filtrate collection mechanism.

Figure 4A:
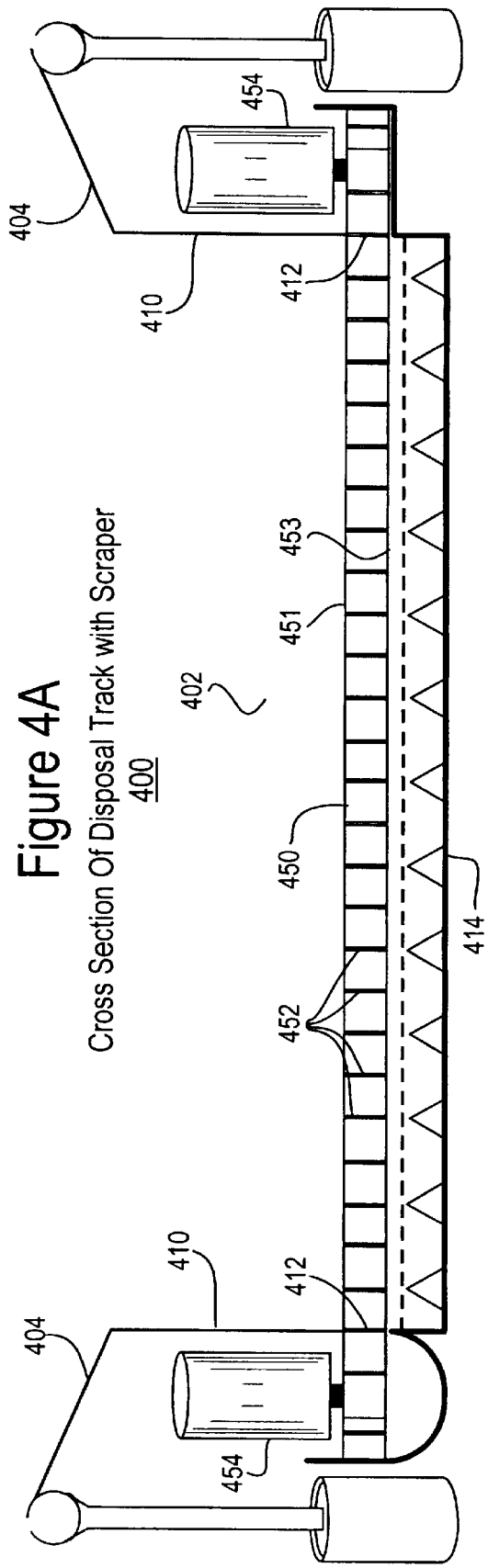
FIGS. 4A and 4B show a disposal track which incorporates a scraper means for excavating waste residue in accordance with a preferred embodiment of the present invention.
Figure 4B:
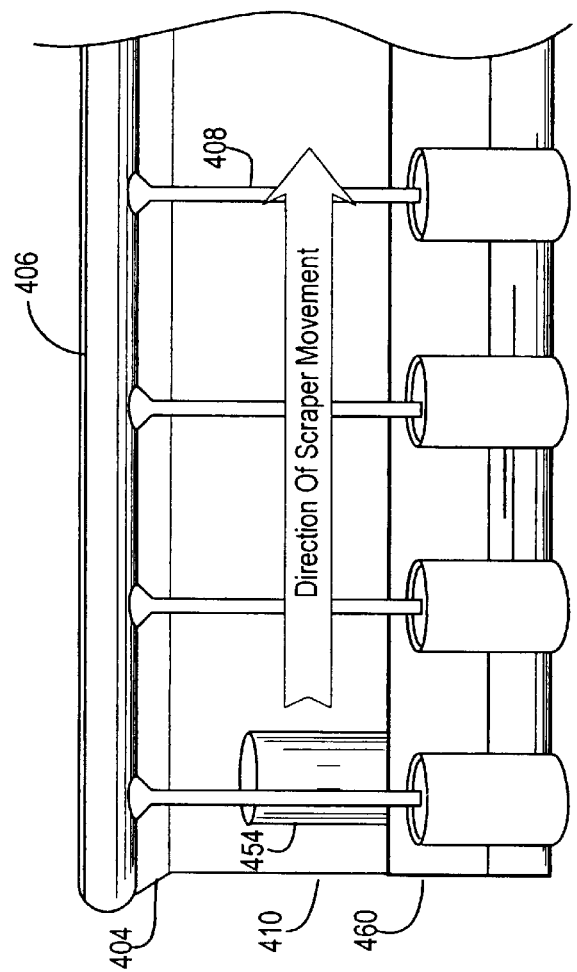

With respect to FIGS. 4A and 4B, disposal track 400 is shown which incorporates a scraper means for excavating waste residue in accordance with a preferred embodiment of the present invention. FIG. 4A illustrates a cross-section of disposal track 400 which is similar in every detail with disposal track 300 described above with respect to FIG. 3 with the exception of the inclusion of scraper 450. In response to the shortcomings of the prior art, scraper 450 provides a means to remove waste residue from the bottom of disposal track 400 without interfering with the lifecycle of the fly larvae (or other bio-conversion living systems) feeding on the putrescent waste in the upper few inches of disposal area 402. In a preferred embodiment of the present invention, scraper 450 comprises at least one motor 454 which engages a continuous chain (not shown) having a plurality of blades 452 affixed. Blades 452 scrape waste residue from the bottom of disposal area 402 and carry the waste to a waste residue receptacle, or conveyor belt, from disposal area 402. Scraper 450 extends laterally across disposal area 402 between opposing vertical curtains 410. In accordance with a preferred embodiment of the present invention, scraper 450 extends laterally from the exterior of vertical curtain 410, through excavation gap 412, across the lateral extent of disposal area 402, through excavation gap 412 at the opposite vertical curtain 410 and outside that curtain. A second motor 454 may provide additional rotation power to engage the chain of scraper 450 at that point. Securely attached to the chain are a plurality of blades 452 that scrape a layer of waste residue from the bottom of disposal area 402 and through excavation gap 412 when power is applied to the chain by one or both motors 454. Upper plate 451 shields the upper portion of blades 452 from contacting the waste material in disposal area 402, while lower plate 453 shields the lower portion of blades 452 from contacting under-pan 414. Simultaneously with the movement of blades 452, scraper 450 feeds waste residue to blades 452 by moving longitudinally along disposal track 400. A set of chains, or other means, may be provided to pull scraper 450 along the base of disposal track 400. Conversely, scraper 450 may provide the movement means necessary for traversing the lateral extent of disposal track 400. In that case power from motor 454 is diverted to a drive wheel or gear which pulls scraper 450 along a pathway fabricated onto under-pan 314.

In another preferred embodiment of the present invention the scraper comprises a motor and a rigid auger means (not shown). There, the auger laterally bores, or scrapes, into disposal area 402 by rotating the auger bit. Again, the auger moves longitudinally along disposal track 400 to feed the auger blade waste residue.

With reference to FIG. 4B, a diagram depicting a side view of disposal track 400 with a scraper is shown in accordance with a preferred embodiment of the present invention. FIG. 4B depicts disposal track 400 from the left side view of the cross-section shown in FIG. 4A. Here, a scraper is seen in the left-most position with respect to disposal track 400 (forward-most position with respect to FIG. 4A) as can be ascertained from the position of motor 454. Note in this figure, blades 452 are not visible due to conveyor assembly 460.

In operation, scraper 450 proceeds from either the left-most or right-most end of disposal track 400. Motor or motors 454 are activated which engage the chain on which blades 452 are fixed. As shown in the position depicted in FIG. 4A, the scraper chain turns in a clockwise rotation thus allowing blades 452 to evacuate waste residue from disposal area 402 onto conveyor assembly 460. Simultaneously with scraper chain turning in a clockwise direction, scraper 450 moves along a scraper track (not seen) from left to right along disposal track 400. In so doing, scraper 450 evacuates a waste residue excavation interval of a predetermined height onto conveyor assembly 460 without disturbing the upper layers of putrescent waste in which the fly larvae are active. Of course, the height of the waste residue excavation interval is determined by the height of blades 452.

Although not shown in FIG. 4B, once scraper 450 reaches the right-most extent of disposal track 400 the waste residue excavation operation is complete until the amount of putrescent waste material deposited in disposal area 402 reaches the height in which a return excavation pass from scraper 450 is necessary. That height can be established by the relationship of the waste material with ramp 404. While the waste material should never extend too far over the lower portion of ramp 404, the waste material must always be high enough to allow the larvae access to ramp 404. Therefore, if a return excavation pass would lower the height of the waste material enough to deny the larvae access to ramp 404, it is better to wait for more waste material to accumulate rather than allowing the larvae to pupate in disposal area 402 of the disposal track. Once the determination is made to make a return excavation pass, the rotation of scraper blades 452 is reversed from clockwise to counterclockwise and scraper 450 proceeds from right to left, once again evacuating the waste residue onto conveyor assembly 460.

Figure 5:
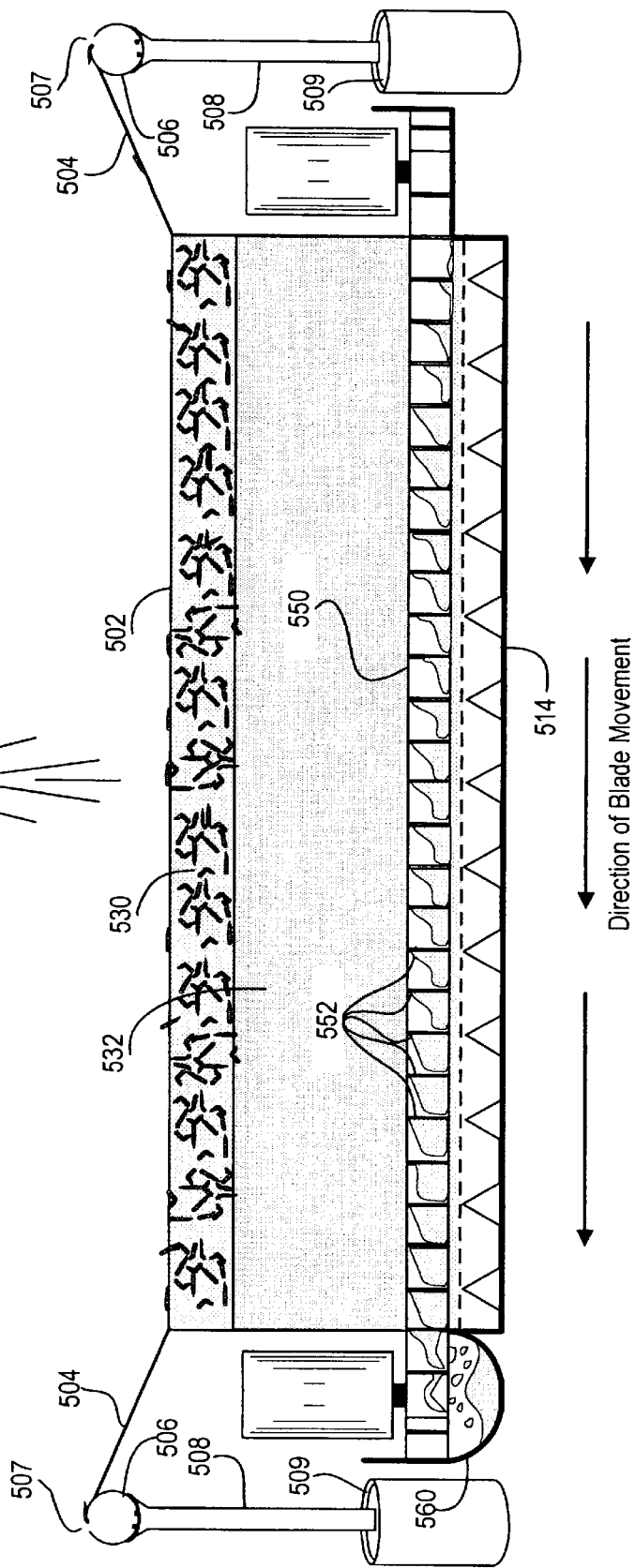
FIG. 5 is a more complete diagram depicting a cross-sectional view of a disposal track with the scraper and putrescent waste shown in accordance with a preferred embodiment of the present invention.

Turning now to FIG. 5, a more complete diagram depicting a cross-sectional view of a disposal track with the scraper and putrescent waste is shown in accordance with a preferred embodiment of the present invention. As discussed above, the putrescent waste material and the living systems feeding on the waste material are laid out in long disposal tracks 500. The bio-conversion living systems occupy only the top few inches of the putrescent waste in disposal area 502. It is assumed that the rate of putrescent waste deposition is such that as the height of waste surpasses the feeding depth of bio-conversion living systems, the usable nutrients have been extracted by the organisms. Below the feeding depth, disposal waste material 532 has been exhausted of useful nutrients and of no further value to the present living system.

If fly larvae are selected as the bio-conversion living system, the most efficient means initiating the bio-conversion process is by first filling disposal track 500 to the base of ramp 504 with some inert material such as fill or compost. Then, depositing several inches of larvae in all stages of development to occupy the surface of the compost in disposal track 500. Putrescent waste material is then deposited on the surface of this seething mass of larvae. The larvae will immediately feed on the putrescent waste. In the case of certain farm animals or poultry, the waste need not be flushed or scrapped. The on-site or in situ disposal of waste is a perfectly viable option. Likewise, shredded food waste is easily pumped onto the surface of the disposal track.

Once the bio-conversion process is underway, eggs are deposited directly upon the putrescent waste within disposal track 502 to replenish mature larvae which have been harvested. The deposition of fly eggs may be accomplished by any of three methods: manually by seeding the waste material with fly eggs; wild fly populations wherein seeding is accomplished automatically; or from captive breeding flies that are kept especially for seeding the putrescent waste with eggs. Unless the manual seeding method of deposition is selected, no human manipulation of fly eggs is required. Of course certain accommodations may be necessary depending on the species of fly selected. If the common housefly is selected for captive breeding and egg depositing, then dried milk, sugar and water must be made available to the adults. In winter time, heat lamps may be set up in proximity to the feeding areas to provide warmth. However, if the solider fly is selected for bio-conversion process, it appears that the adult soldier fly does not require food, but it does have an unusual mating behavior centered around territorial claims to parts of a bush. Artificial plants have successfully been used to entice the black soldier fly to mate and reproduce in a greenhouse during winter time.

As individual fly larvae 530 mature, the larvae feel the need to leave the putrescent waste and find a more accommodating environment for which to pupate. Fly larvae 530 then empty their guts of waste and set out in search of an ideal pupation site. Certain species of larvae, such as the larvae of the black soldier fly, will crawl over fifty feet to find an ideal site. For larvae 530, an ideal pupation site must be free of the enormous bacteriological activity which characterizes waste disposal area 502 of disposal track 500, be free of small predators such as mites and pseudo-scorpions, and be free as well of large predators such as birds, armadillos, opossums and raccoons. If the putrescent waste in disposal track 500 is too dry, bacteriological activity may slow down to such an extent that fly larvae 530 may pupate in the putrescent waste and not leave disposal area 502. At times it may become necessary to mist water onto the surface of the putrescent waste.

Light plays a central role in determining their initial migratory behavior. The absence of light may signal the absence of predation. In any case, fly larvae 530 are negatively phototactic, and they crawl away from light. Therefore, light bank 542 may be positioned above the centerline of disposal area 502, leaving its two lateral edges and ramps 504, shaded. When larvae 530 reach the lateral edge of disposal area 502, they exit disposal area 502 via ramp 504. This uphill inclination makes it difficult for the larvae to carry along any adhering residue. In the case of housefly larvae, it is necessary to moisten the surface of ramp 504 so as to provide traction. This is not necessary for soldier fly larvae.

Upon reaching collection tube 506, fly larvae 530 fall through longitudinal slit 507 which runs the length of ramp 504 into the interior of the collection tube 506. Once inside collection tube 506, larvae 530 crawl horizontally along the bottom of the tube until they come to vertical downspout 508. The larvae drop into downspout 508 and into container 509 which is emptied periodically depending on seasonal weather conditions, the type of putrescent waste material used in disposal track 500 and the species of fly larvae used. The larvae abandon the waste only when they have reached their final mature pre-pupal stage, and they crawl out of the waste into container 509 without any mechanical or human intervention. As can been seen from the above, fly larvae 530 are an excellent choice for a bio-conversion living system because they are totally self-harvesting.

The extraction of the waste residue 532 is accomplished by means of scraper 550. The length of scraper 550 corresponds to the width of disposal area 502. Scraper 550 travels underneath the putrescent waste in disposal area 502 moving from one longitudinal end of disposal track 500 to the other. When the level of larvae and fresh putrescent waste rises above the base of ramp 504, scraper 550 is set in motion, extracting a height of waste residue approximately equal to the height of scraper blades 552 (approximately two inches of waste residue). The concept is quite simple: waste is deposited on the surface of disposal area 502, and waste residue is periodically excavated from the bottom of waste residue 532.

Notice that the cross-section of disposal track 500 is taken at the point on disposal track 500 intersecting scraper blades 552 on scraper 550. In this diagram, blades 552 are moving in the direction of the arrows, from right to left, excavating waste residue 532 from disposal area 502 and depositing the residue in conveyor assembly 560. Conveyor assembly 560 contains a small conveyor belt (approximately six inches in width) running parallel to disposal track 500, which completes the final evacuation of waste residue 532. The entire scraper 550 moves along the base of disposal track 500 as it excavates disposal area 502. Scraper 550 rides atop scraper tracks (not shown) or under-pan 514 as it moves. In the present situation, scraper 550 would move back-to-front, or in the direction of the viewer, as it excavates waste residue 532 into conveyor 560.

It should be understood that although not shown in the drawing, the height of the putrescent waste in disposal area 502 will be reduced by approximately the height of scraper blades 552 as scraper 550 passes disposal area 502 from back to front.

Figure 6A:
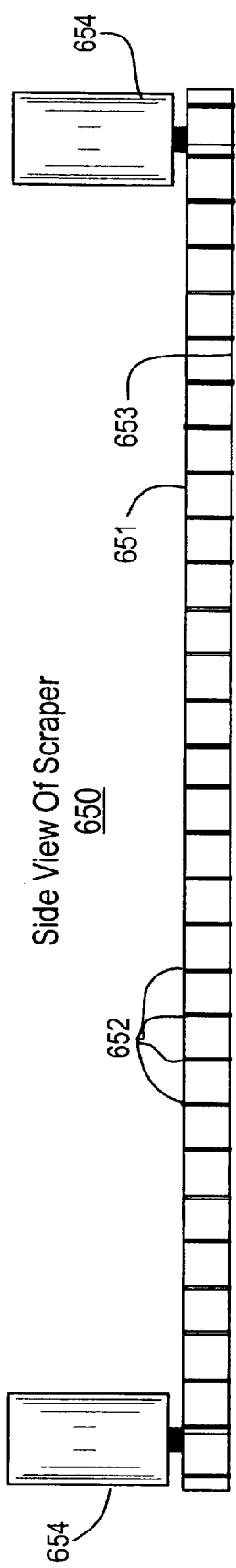
FIGS. 6A and 6B illustrate the scraper assembly in cross-sectional view and plan view in accordance with a preferred embodiment of the present invention.
Figure 6B:
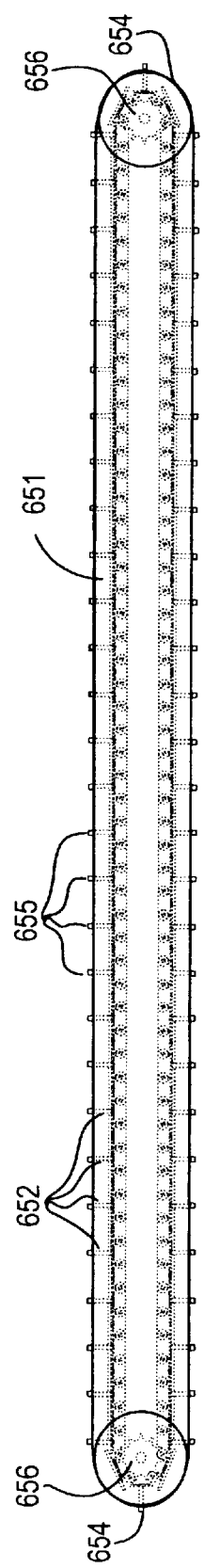

Referring now to FIGS. 6A and 6B, the scraper assembly is shown in side view and plan view in accordance with a preferred embodiment of the present invention. FIG. 6A shows the side view of scraper 650 in an orientation similar to that discussed above with respect to the scraper in FIGS. 5 and 4A. Blades 652 are contained within upper plate 651 and lower plate 653. In this diagram, the axes of motors 654 are oriented in a vertical direction while the lateral edges of blades 652 are oriented towards the viewer.

In contrast with FIG. 6A, FIG. 6B shows a plan view of scraper 650. Here it can be seen that blades 652 are affixed to individual links (not shown) on a continuous chain which extends from sprocket 656 on the left to a second sprocket 656 on the right. Note that upper plate 651 covers the entire chain, link and all but a fraction of blades 652, exposed portion 655. During testing it was discovered that exposed portion 655 need only measure one to three millimeters past upper plate 651 to provided adequate evacuation of waste residue from the disposal area. However, the type of putrescent waste material used in the disposal track may affect the length of the blades exposed beyond upper plate 661 necessary for optimum operation. Once motors 654 are energized, sprockets 656 turn, engaging the chain and causing blades 652 to follow the path of the chain from one sprocket to the next and then back. As scraper 650 moves along the disposal track, only exposed portion 655 engages the wasted residue rather than entire blade 652. Waste residue is evacuated from directly in front of path of scraper 650 only. Thus, blade binding is minimized and cave-ins are eliminated, allowing for an even layer of waste residue to be excavated while the bio-conversion process proceeds, unaffected by excavating.

Figure 7:
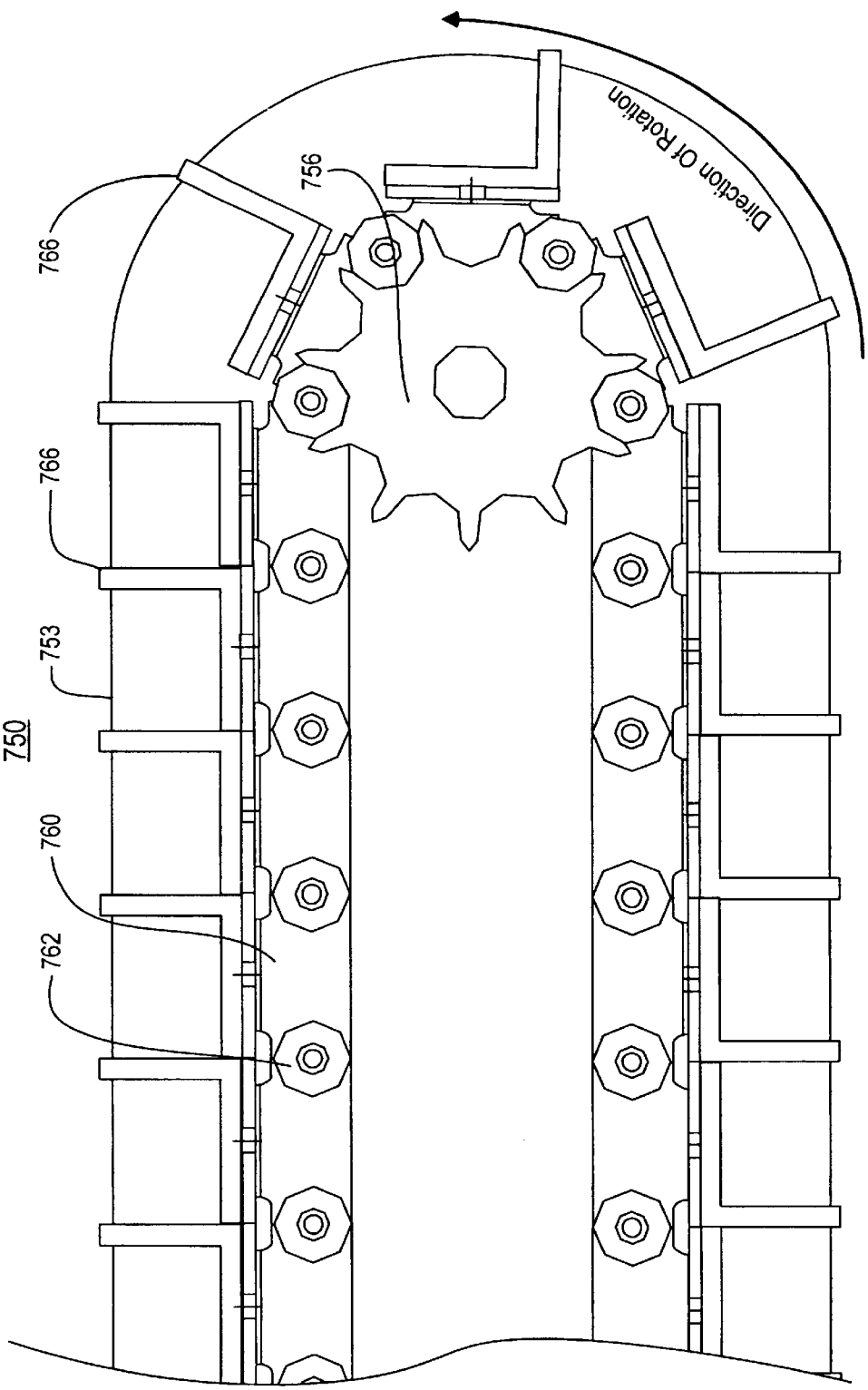
FIG. 7 is a blow-up cross-sectional diagram of a portion of a scraper in accordance with a preferred embodiment of the present invention.

With reference to FIG. 7 the blow-up cross-section of a portion of the scraper is shown in accordance with a preferred embodiment of the present invention. Scraper 750 is fabricated out of a chain fitted with blades 766. Here the chain structure of scraper 750 can be viewed in detail which includes a plurality of rollers 762 interposed between and connecting pairs of links 760. Here the teeth of sprocket 756 engage rollers 762 and pull links 760 around the sprocket in the direction of rotation. As the scraper advances underneath the disposal track, blades 766 evacuate the larval residue at a 90° angle to the longitudinal axis of the disposal track.

In one embodiment of the present invention, blades 766 are constructed with sections of angle iron having the approximate height of scraper 750. This embodiment has the advantage of being relatively simple and cost effective. However, it has a disadvantage in that blades 766 tend to collect waste residue without fully evacuating the contents of blades 766 to links 760. The problem is exacerbated in conditions where the waste material is damp and sticky and tends to cake on the surface of blades 766.

Figure 8:
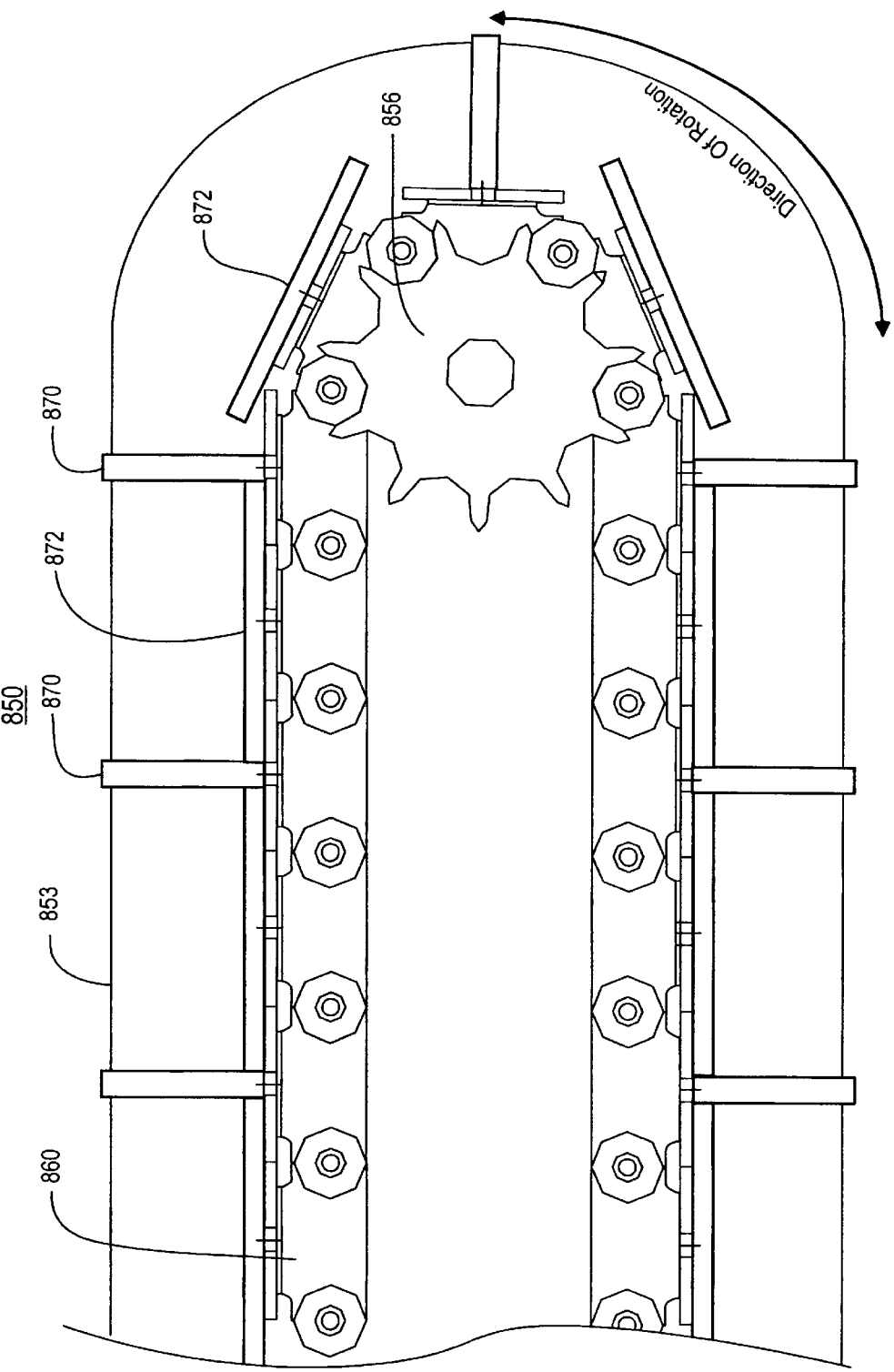
FIG. 8 is a blow-up cross-sectional diagram of a scraper shown in accordance with a preferred embodiment of the present invention.

With respect to FIG. 8, a blow-up cross-sectional diagram of scraper 850 is shown in accordance with a preferred embodiment of the present invention. Here, scraper 850 is identical in every respect to scraper 750 shown in FIG. 7 with the exception of the construction of the blade assembly.

In accordance with this embodiment. Father than mounting a blade such as a section of angle iron on each link 860, blades 870 are alternately mounted on links 860 with backplates 872. By using this configuration, backplates 872 wipe the forward side of blades 870 as the chain rounds sprocket 856. As the link 860 is pulled onto and eventually around sprocket 856 the trailing edge of that backplate is forced up along the forward side of the adjacent blade thus wiping any solidified waste residue off the blade. As the links continue around sprocket 856 and eventually off the gear, backplate 872 is once again positioned at right angles to and abutting adjacent blades 870.

The present invention allows for efficient bio-conversion of putrescent waste to living systems such as fly larvae in situ with waste production heretofore unknown in the prior art. In situ bio-conversion saves transportation costs associated with transporting putrescent waste from the waste generation site to the bio-conversion facility. Also, the present invention is much less complex than prior art facilities which rely on conveyor belts to move developing larvae to troughs for collection. Additionally, the present invention is far more efficient in producing mature larvae because there is no lag time associated with evacuating waste residue as was inherent in the prior art bio-conversion facilities. Thus, the present invention allows for continuous harvesting of mature larvae rather than being burdened by the lag time necessary for larvae to reach maturity for harvest.

Figure 9:
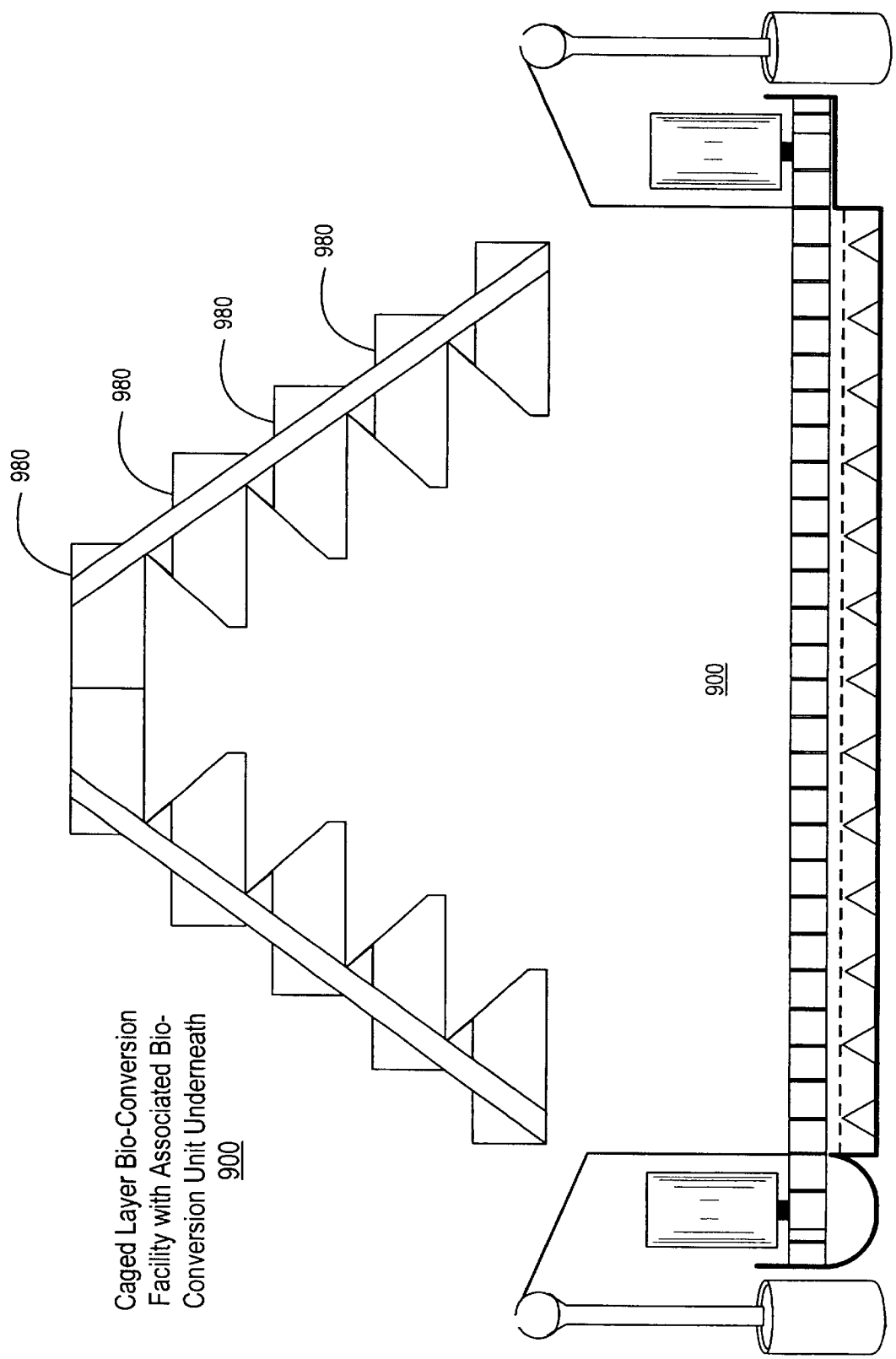
FIG. 9 is a diagram depicting a bio-conversion facility with a scraper is shown configured with a cage-layer egg-laying operation in accordance with a preferred embodiment of the present invention.

Additionally, the present invention is flexible enough to provide in situ bio-conversion in a variety of waste production applications. With respect to FIG. 9 a diagram depicting a bio-conversion facility with scraper in accordance with a preferred embodiment of the present invention is shown configured with a cage-layer operation. In this configuration, cages 980 configured in a cage-layer arrangement are positioned above the depositional area of disposal track 900. As chicken waste falls into the depositional area, fly eggs are introduced and the fly larvae feed on the putrescent chicken waste. The disposal track functions in exactly the same manner described above without any modification for the type of waste producing operation.

Figure 10:
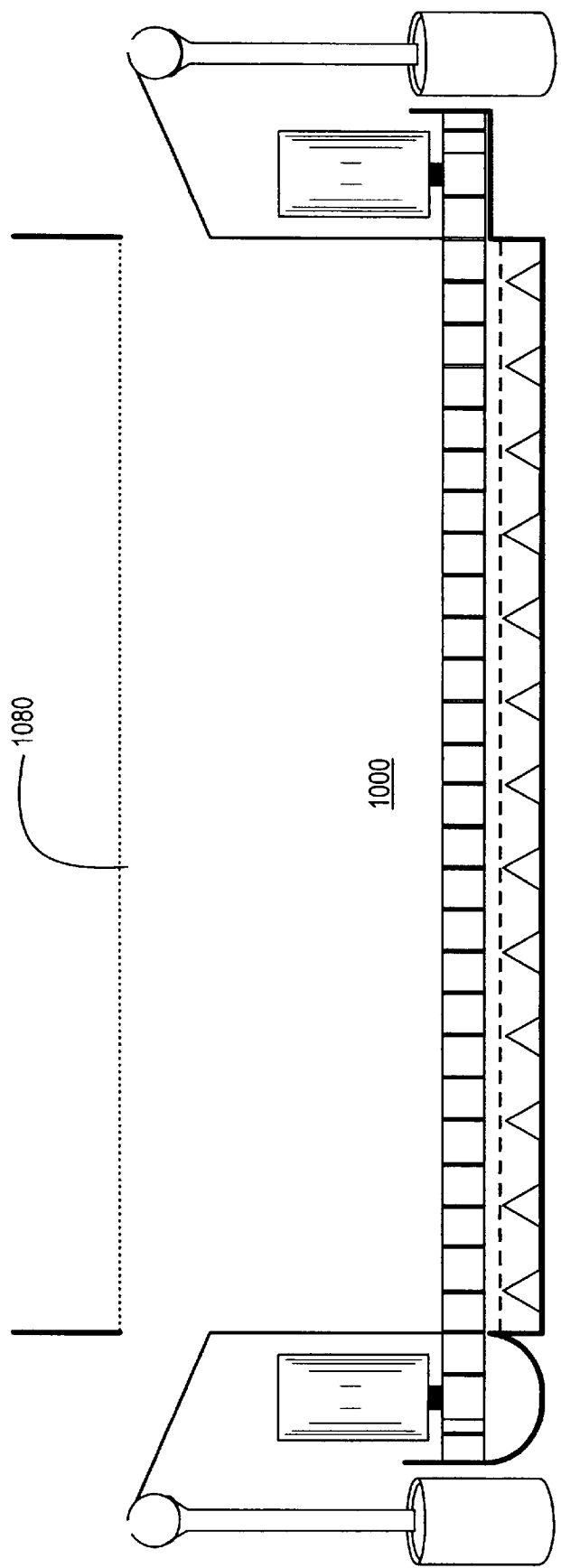
FIG. 10 is a disposal track is shown in situ with a suspended broiler cage operation in accordance with a preferred embodiment of the present invention.

With respect to FIG. 10, a disposal track is shown in situ with a suspended broiler cage operation in accordance with a preferred embodiment of the present invention. In this case, the disposal area of disposal track 1000 is positioned beneath novel arrangement of broiler cage 1080. Again, the operation of the disposal track is as exactly as described above even though it is combined with a far different waste generation operation.

Figure 11:
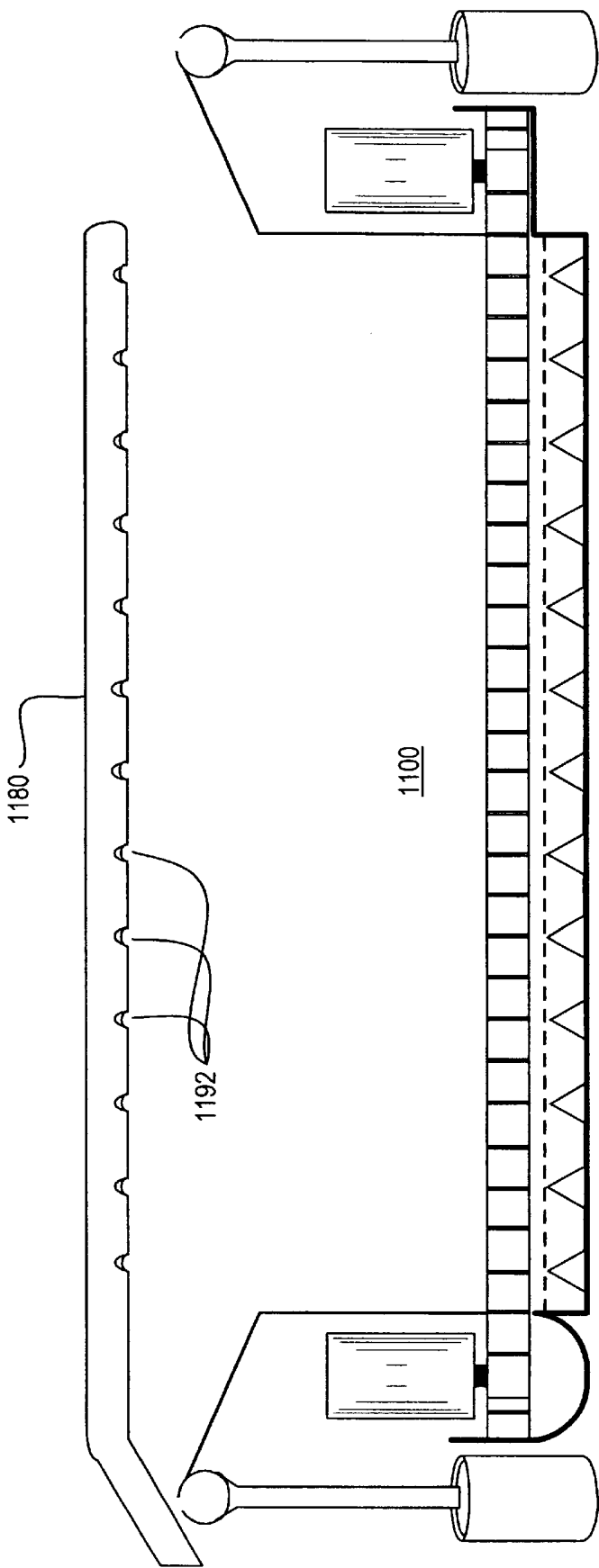
FIG. 11 is a diagram depicting a bio-conversion facility which utilizes a pumping means and a disposal track with scraper in accordance with a preferred embodiment of the present invention.

One of ordinary skill in the art would understand that the flexibility of the disposal track allows for in situ combination with many different types of waste generation operations. Similarly, the disposal track may be utilized in a prior art bio-conversion facility wherein the putrescent waste is applied by means of a mobile suspended paddle box. With reference to FIG. 11 a diagram depicting a cross-section of a bio-conversion facility which utilizes a pumping means with powered spreader and a disposal track with scraper is shown in accordance with a preferred embodiment of the present invention. Here it will be apparent that disposal track 1100 is identical to the disposal track and scraper discussed in the figures above. However, rather than utilizing disposal track 1100 in an in situ waste generation application, the putrescent waste is applied across the surface of the disposal area by means of a waste spreader such as suspended power spreader 1180.

Power spreader 1180 is a tube or casing which is suspended directly above disposal track 1100. Power spreader 1180 is approximately horizontal with a plurality of waste extrusion holes 1192 facing disposal track 1100. Putrescent waste material is feel into power spreader 1180 by means of a pump. It is expected that the pump would accommodate high volumes of relatively viscous putrescent waste material at a comparatively low pressure. As waste material is pumped into power spreader 1180, long "sausages" of putrescent waste is extruded from each extrusion hole. As the putrescent waste sausages are extruded onto the surface of the disposal volume, power spreader 1180 is move longitudinally along the disposal track leaving rows of putrescent waste sausages for the larvae to feed.

In this case putrescent waste can be transported to the bio-conversion facility from any number of waste generation sites. In some cases, depending on the source of the waste material, the waste material should be tested for toxins and heavy metals prior to usage as discussed in the prior art. In a preferred embodiment a truck with a pumping means, hopper (not shown) and power spreader 1180 is used to deposit the waste material. The putrescent waste is added to the hopper and the truck moves along the disposal track with the power spreader over the disposal area. Easily, this embodiment could accommodate dual power spreaders for tandem rows of disposal tracks.

Another feature of a preferred embodiment of the present invention is the conditioning of disposal waste for secondary and tertiary bio-conversion processes, both in the disposal track and after excavation by the scraper. The design of both the disposal track and the scraper, foster supplementary further bio-conversion living systems. For example, if putrescent waste is deposited at a rate of a half inch per day, and if the reduction rate for the volume of the waste due to bio-conversion and fluid losses is 50%, then the waste (larval) residue remains within the system for a period of 56 days, assuming a fourteen inch disposal area height. An approximation for Residence Time is shown as:

$$\text{Residence\_Time} = \frac{\text{height\_of\_disposal\_area}}{(\text{deposition\_time}) \cdot (\text{deposition\_rate}) \cdot (\text{reduction\_rate})}$$

If the reduction rate for a volume is only 25%, then the residence time of the residue is 112 days (14/0.125). If the reduction rate for a volume is at 10%, then the residence time is 280 days (14/0.05). If at each pass of the scraper, two inches of residue are removed (assuming a two inch scraper blade), then in the first case the scraper should be operated every 8 days (2/0.25), in the second case, every 16 days (2/0.125), and in the third case, every 40 days (2/0.05).

$$\text{Scrape\_Time} = \frac{\text{height\_of\_scraper\_baldes}}{(\text{deposition\_time}) \cdot (\text{deposition\_rate}) \cdot (\text{reduction\_rate})}$$

If the residence time of the larval residue varies between 56 and 280 days, then this leaves considerable time for fungi and actinomycetes to initiate decomposition of those components of the plant cell wall which the bacteria and larvae were not able to break down. As a complex polymer of phenylpropane, lignin is particularly difficult to biodegrade, and at the same time, it reduces the bioavailability of the sugar components of the plant such as cellulose and hemicellulose. Fungi have developed the necessary enzymes to break down lignin. Actinomycetes can do the same, but as a rule, they only break down 20% of the total lignin present.

Lignin degradation is primarily an aerobic process. The aeration provided by the under-pan (described with respect to FIG. 3) helps to promote lignin degradation within the larval residue. Adequate nitrogen, moisture and temperature are all factors which influence the rate of lignin decomposition, together with the particle size and the chemical structure of the lignocellulosic substrate. The white-rot fungus, *Phanerochaete chrysosporium*, is particularly effective in degrading lignin. Also, *Pleurotus eryngii* has been studied in this regard. Here much research is still required. Both fungi and actinomycetes have evolved strategies to inhibit bacterial growth through the use of antibiotics. It appears that the larvae of the black soldier fly has also evolved an ability to do the same. The black soldier fly larvae also produce a pheromone which appears to be very effective at repelling other species of flies from establishing a larval colony in the same waste material as the black solider fly larvae colony. Apparently, black solider fly larval colonies will not integrate with other fly species.

When the proper conditions are right within the waste residue for the growth of fungi and actinomycetes, a secondary decomposition takes place. The products of this mycotic decomposition of the waste residue may be shredded and made available to either the same or a different larval species for a secondary bio-conversion process utilizing larval treatment. It could also be made available to the earthworm.

The earthworm secretes calcium carbonate from calciferous glands near its gizzard. This gizzard does an excellent job of grinding down ingested particles. The earthworm utilizes a variety of digestive enzymes and other substances to process these fine particles. The residue of the earthworm is excreted in the form of casts, which are, undoubtedly, the finest and most valuable type of humus material. One should not forget that the earthworm also has a value as a source of protein and other nutrients.

The Capricorn Conservation Council states that "with the help of a healthy natural culture of 'compost grubs' (the larvae of the black soldier fly) the initial breakdown of the vegetable material is completed in a few hours, rather than days or weeks, before it has a chance to rot - therefore no smell" Additionally, it states: "All the older compost that has been digested by the compost grub, is then given to composting earthworms to do their job. The finished product is then ready for use by the home gardener."

Real world experiments have been performed under the direction of the inventor. A small prototype disposal track was constructed having a disposal surface area of eight square feet (8 ft$^2$). A small food waste disposal unit that handles all the food waste of a local restaurant was an initial test study. The first step in this disposal process is to shred the food waste without, of course, reducing it to a paste. To this end, a commercially available chopper called a "Buffalo Chopper," model Senator, from Hermann Scharfen GmbH & Co. Maschinenfabrik KG was used. A similar chopper is available from the Hobart Corporation, 701 S. Ridge Ave. Troy, Ohio 45374. After chopping, the food was deposited onto the disposal track by hand. In a large-scale operation, the shredded food could be pumped onto the surface of the disposal track as described above with respect to FIG. 11. As the larvae reach maturity, they crawl up the ramp and into the larval collection tube. The larvae crawl along the collection tube until they reach a downspout. A container is placed under each downspout to collect the larvae. Each day on average twenty-four pounds (24 lbs.) of food waste (64% average moisture) was fed to the larvae, which is equivalent to 3 lbs/ft$^2$/day loading. For that amount of waste, approximately 3.6 pounds of larvae was collected daily. This gives a conversion rate of fresh waste into fresh larvae of approximately 15%. Using the experimental results as a gauge, large scale results an be estimated. A disposal track of 12×300 feet (3,600 ft$^2$) could handle 10.800 lbs of waste per day, and it would generate more than 1,600 lbs of larvae per day.

According to the USDA National Agricultural Statistics (1997), the USA raised:

8.386 million chickens, turkeys, ducks 99 million beef and dairy stock 60 million swine 8 million sheep and goats In the United States, a total of 209.7 million tons of solid waste was generated in 1996 (4.31 lbs per person per day). Of this, 10.4% is food waste. This gives a total of 21.8 million tons of food waste (0.45 lbs per person per day). Of this only a half million tons of food waste was "recovered" or composted in commercial facilities. This 21.8 million tons of food waste could produce 3.27 million tons of larvae per year. If a single 12×300 foot track could handle 10,800 lbs per day, it could serve a population of approximately 24,000 people (10,800/0.45).

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for continuous bio-conversion of putrescent waste comprising:

depositing putrescent waste on a surface of a disposal volume, wherein at least a portion of the disposal volume is comprised of putrescent waste;

bio-converting at least a portion of the putrescent waste in the disposal volume to a living system, wherein the putrescent waste is transformed into waste residue; and simultaneously with bio-converting at least a portion of the putrescent waste in the disposal volume, excavating at least a portion of the waste residue from the disposal volume below the surface of the disposal volume.

2. The method of claim 1, wherein the bio-conversion of putrescent waste is performed in situ with production of the putrescent waste.

3. The method of claim 1, wherein depositing putrescent waste on a surface of a disposal volume is performed in a substantially uniform deposition rate.

4. The method of claim 1, wherein excavating at least a portion of the waste residue from the disposal volume below the surface of the disposal volume further comprises:

scraping an interval of waste residue from the disposal volume, wherein a surface of the interval is substantially parallel to the surface of the disposal volume.

5. The method of claim 4 further comprising:

aerating the waste residue; and depositing the waste residue to a waste residue receptor.

6. The method of claim 1 further comprising:

filtering liquid from the disposal volume.

7. The method of claim 5, further comprising:

recovering the waste residue to a waste residue receptor;

depositing the waste residue as secondary putrescent waste in a secondary disposal volume; and bio-converting at least a portion of the secondary putrescent waste in the secondary disposal volume to a living system.

8. The method of claim 1 further comprising:

harvesting the living system.

9. The method of claim 1, wherein the living system is insect larvae which are used for bio-converting the putrescent waste in the disposal volume into waste residue, the method further comprising:

harvesting the insect larvae.

10. The method of claim 9 further comprising:

rearing the insect larvae to adult insects;

breeding the adult insects; and depositing insect eggs in the disposal volume from the adult insects.

* * * * *